United States Patent
McIntyre

(10) Patent No.: US 7,668,930 B2
(45) Date of Patent: Feb. 23, 2010

(54) WEB SERVICE DISTRIBUTION SYSTEM OVER THE WORLD WIDE WEB USING WEB SERVICES DESCRIPTION LANGUAGE (WSDL) STANDARD INCLUDING IMPLEMENTATION FOR UNIFORMLY GENERATING ALL FAULT CONDITIONS IN WSDL MESSAGE FORMAT

(75) Inventor: Joseph Herbert McIntyre, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 916 days.

(21) Appl. No.: 10/992,379

(22) Filed: Nov. 18, 2004

(65) Prior Publication Data

US 2006/0168215 A1 Jul. 27, 2006

(51) Int. Cl.
*G06F 15/16* (2006.01)
(52) U.S. Cl. .................. 709/217; 709/219; 714/799
(58) Field of Classification Search .......... 709/203, 709/213, 219, 225, 217; 714/48, 52, 799; 719/313, 318, 330
See application file for complete search history.

(56) References Cited

U.S. PATENT DOCUMENTS

| | | | |
|---|---|---|---|
| 5,961,603 A * | 10/1999 | Kunkel et al. ............... 709/229 |
| 6,314,425 B1 * | 11/2001 | Serbinis et al. ............... 707/10 |
| 6,434,601 B1 * | 8/2002 | Rollins .................... 709/206 |
| 6,438,615 B1 * | 8/2002 | Faustini .................... 719/315 |
| 6,523,754 B2 * | 2/2003 | Hoshino et al. ............. 235/492 |
| 6,757,899 B2 | 6/2004 | Zhdankin et al. ............ 719/315 |
| 7,028,223 B1 * | 4/2006 | Kolawa et al. ................ 714/38 |
| 7,194,733 B2 * | 3/2007 | Ringseth et al. ............. 717/136 |
| 2002/0099738 A1 | 7/2002 | Grant ....................... 707/513 |
| 2003/0110242 A1 | 6/2003 | Brown et al. ................ 709/222 |
| 2004/0059704 A1 | 3/2004 | Hellerstein et al. ............ 707/1 |
| 2004/0133656 A1 | 7/2004 | Butterworth et al. ........ 709/219 |

\* cited by examiner

*Primary Examiner*—Saleh Najjar
*Assistant Examiner*—Marie Georges Henry
(74) *Attorney, Agent, or Firm*—J. B. Kraft; David A. Mims, Jr.

(57) ABSTRACT

A Web Service distribution system with the standard combination of a general protocol for the transporting and handling of data entities to and from Web stations, e.g. SOAP layered over HTTP, including means for detecting fault conditions in these general protocol transport and handling means with standard Web Services Description Language (WSDL) definitions for accessing specific Web Services for said data entities. There are standard processes for detecting fault conditions in said WSDL combined with routines responsive to the detection of WSDL fault conditions for sending WSDL fault message data to selected applications at display stations. There is prohibition of the sending of general protocol fault message data (e.g. SOAP message data) detected in the transport and handling of data entities for which entities Web Services are to be accessed combined with routines for converting the fault messages based on general protocol fault data into WSDL message data during the access of such Web Services, whereby said converted data is sent as a WSDL defined fault message.

9 Claims, 4 Drawing Sheets

WEB SERVICE DISTRIBUTION SYSTEM OVER THE WORLD WIDE WEB USING WEB SERVICES DESCRIPTION LANGUAGE (WSDL) STANDARD INCLUDING IMPLEMENTATION FOR UNIFORMLY GENERATING ALL FAULT CONDITIONS IN WSDL MESSAGE FORMAT

TECHNICAL FIELD

The present invention relates to distribution of data over the World Wide Web network (the term is used interchangeably herein with Internet Protocol networks), and particularly to the distribution of data entities using Web Services standards and protocols.

BACKGROUND OF RELATED ART

The past decade has been marked by a technological revolution driven by the convergence of the data processing industry with the consumer electronics industry. The effect has, in turn, driven technologies that have been known and available but relatively quiescent over the years. A major one of these technologies is the Internet or Web. The convergence of the electronic entertainment and consumer industries with data processing exponentially accelerated the demand for wide ranging communication distribution channels, and the Web or Internet, which had quietly existed for over a generation as a loose academic and government data distribution facility, reached "critical mass" and commenced a period of phenomenal expansion. With this expansion, businesses and consumers have direct access to all matter of databases providing documents, media and computer programs through related distribution of Web documents, e.g. Web pages or electronic mail. Because of the ease with which documents are distributable via the Web, it has become a major source of data. Virtually all databases of public information throughout the world are accessible and able to be searched via the Web.

The ease with which great volumes of data may be searched from a computer attached to the Internet and equipped with a Web browser has led to the development of widespread electronic commerce over the Web. At the present time, it is becoming very rare to find a business organization of any kind that does not transact some aspect of the business via the Web. As consumers and businesses become more familiar and comfortable with Web transactions, they become more and more willing to try the Web for other commerce.

Another technology, the development of which has been accelerated by the Web, is object oriented programming. The computer and communications industries are extensively participating in the development and upgrading of Java or like object oriented programming that may be distributed over the Internet or Web or like private networks. For details and background with respect to the Java system, reference may be made to a typical text, *Just Java*, 2nd Edition, Peter van der Linden, Sun Microsystems, 1997.

With the development and rapid expansion of the Web and other like networks, hypertext markup languages became the primary vehicle for distribution of data over such networks. A basic hypertext language, HTML, is described in detail in the above-entitled *Just Java* text, particularly at Chapter 7, pp. 249-268, dealing with the handling of Web pages; and also in the text, *Mastering the Internet*, G. H. Cady et al., published by Sybex Inc., Alameda, Calif., 1996, particularly at pp. 637-642, on HTML in the formation of Web pages. The Web pages are implemented so as to be used for the distribution of Web documents containing text, images, both still and moving, and sound, as well as programs.

The above three rapidly evolving technologies: the Web distribution network; object oriented programming; and hypertext markup languages, have now all been correlated into a system for distribution and exchange via the Web of data between any two computer applications. The system is specifically known as Web Services. The system is based on both suppliers of the data in the form of text based documents and the users of such data conforming to several industry standards developed by the World Wide Web Consortium (W3C). The primary standard is Extensible Markup Language (XML) for defining data and creating markup languages in the form of XML tags. The resulting XML documents are text based and, thus, may be processed on any platform in the distribution of the Web Services. Accordingly, suppliers who wish to offer their Web Services must qualify the proposed services according to the following standards:

XML: a hypertext markup language extensively used in the distribution of Web Services and other electronic business components over the Web. (For a basic description of Web Services, reference is made to the text: *Web Services, A Technical Introduction*, H. M. Deitel et al., published 2003, Prentice Hall, Upper Saddle River, for general information and particularly to Appendix A, pp. 319-334.)

(SOAP) Simple Object Access Protocol: a protocol established to enable the programming objects that form part of the XML items being distributed to communicate with each other via messages (Chapter 6 of the above text).

(UDDI) Universal Description, Discovery and Integration Registry: where suppliers or developers may list their Web Services offered for distribution, i.e. advertise their Web Services.

(WSDL) Web Services Description Language: an XML language used by suppliers and developers for describing the offered Web Services on the UDDI Registry. (Also described in detail in Chapter 6 of the above-mentioned text.) It should be noted that WSDL is a language intended to be read by computer applications rather than human beings. Thus, all messages generated, including fault messages, are read by applications.

To users and suppliers of Web Services who are qualified in all of the above required standards, the system has been efficient in the distribution of services over the Web. The items have been selected by interested users from the UDDI, distributed over the Web from the suppliers to such requesting users and subsequently billed to and tracked, if necessary, by the requesting user. This has been done with a minimum of human, i.e. person-machine intervention being necessary; which, of course, is one the advantages and goals of Web distribution.

However, as a wider spectrum of users and even suppliers become interested in Web Services, it will have to be recognized that many in this wider group will not have the computer sophistication needed to easily conform their products and needs to the above protocols necessary to establish Web Services. Consequently, there is a constant need to continually upgrade Web services so as to make such services more user friendly, i.e. to make using such services simpler and more intuitive to users having limited computer and Web sophistication.

SUMMARY OF THE PRESENT INVENTION

The present invention provides a Web communication network with application access via a plurality of data processors having a Web Service distribution system that makes error or fault message content delivered to using applications simpler and more uniform.

The invention recognizes that in all Web Services processing, the accessing of data entities available through Web Services that will be delivered to applications through messages defined by Web Services Description Language (WSDL) will conventionally first need to be subjected to some preliminary processing with a transport and handling communication protocol. For most Web Services this protocol is SOAP (Simple Object Access Protocol), an XML-based communication protocol made up of a set of Schemas or definitions of format for transmitting XML messages over the network, including the types of data that the message can include, as well as the way that the message must be structured so that the receiving server may interpret the message properly. SOAP is a more sophisticated layer over the standard HTTP Web protocol. The HTTP protocol alone could function for the preliminary processing under some circumstances.

In any event, with the SOAP message processing, I have found that if a fault or error condition arises during the SOAP processing of Web Services inquiries, these fault conditions are processed using the above-described SOAP message structures and processing. This results in the requesting application receiving messages resulting from faults in the SOAP processing as SOAP fault messages populated in an ad-hoc manner. On the other hand, when faults result in the subsequent WSDL processing of Web Service, the same application will receive fault messages in consistent fault message format. The purpose of this invention is to avoid requiring the application developer to program for two different types of fault messages and to deliver all fault messages in the consistent WSDL fault message form.

Thus, the present invention provides a Web Service distribution system comprising the standard combination of general protocol means for the transporting and handling of data entities to and from said Web stations, e.g. SOAP layered over HTTP, including means for detecting fault conditions in these general protocol transport and handling means with standard WSDL means for accessing specific Web services for said data entities. There are standard means for detecting fault conditions in said WSDL means combined with means responsive to the detection of WSDL fault conditions for delivering fault WSDL message data to applications.

The invention then provides means for preventing the delivery of general protocol fault message data (fault data resulting from SOAP processing data) detected in the transport and handling of data entities for which entities Web Services are to be accessed combined with means for converting the prohibited general protocol fault data SOAP fault data into WSDL message data during the access of such Web services, whereby said converted data is delivered as a WSDL message.

BRIEF DESCRIPTION OF THE DRAWINGS

The present invention will be better understood and its numerous objects and advantages will become more apparent to those skilled in the art by reference to the following drawings, in conjunction with the accompanying specification, in which.

DETAILED DESCRIPTION OF THE PREFERRED EMBODIMENT

Figure 1:
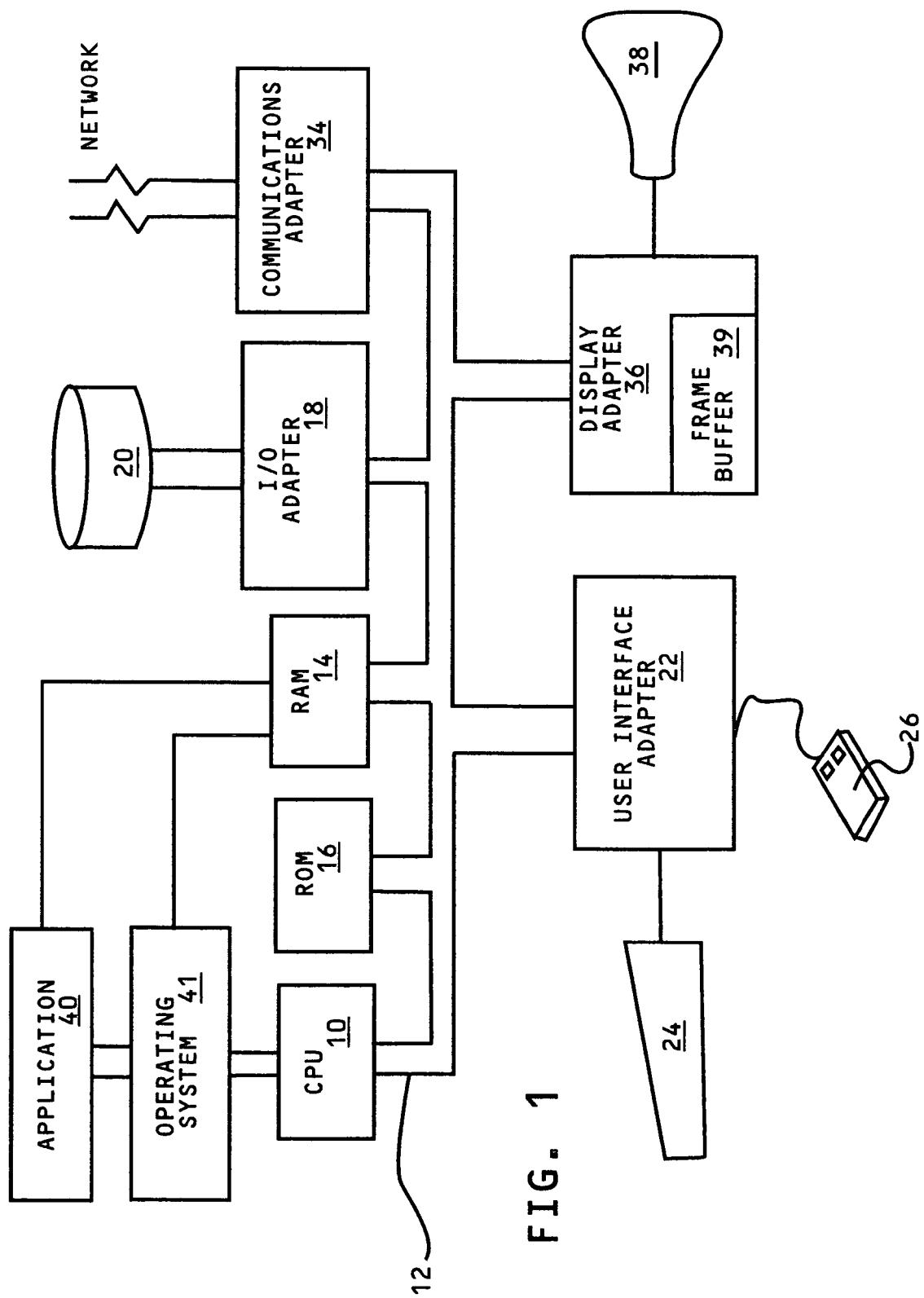
FIG. 1 is a block diagram of a data processing system including a central processing unit and network connections via a communications adapter that is capable of implementing the receiving handling and delivery stations on which the received user requested Web documents, including Web Services, may be received. The system may be used for all of the other computers used in the present invention, including conventional servers used throughout the Web for Web Servers supporting the user or client terminals.

Referring to FIG. 1, a typical data processing terminal is shown that may function as the receiving display terminal containing an application that accesses the Web Services item, as well as the servers on which the SOAP and HTTP protocols are implemented in the seeking of Web Services. The system may also be used for other standard servers used throughout the Web, and other protocols may be used in place of HTTP.

In FIG. 1, a central processing unit (CPU) 10, such as one of the PC microprocessors or workstations, e.g. RISC System/6000™ series available from International Business Machines Corporation (IBM), or Intel microprocessors, is provided and interconnected to various other components by system bus 12. An operating system 41 runs on CPU 10, provides control and is used to coordinate the function of the various components of FIG. 1. Operating system 41 may be one of the commercially available operating systems, such as Microsoft's WindowsXP™ or Windows2000™, as well as IBM AIX and other UNIX operating systems. Application programs 40, controlled by the system, are moved into and out of the main memory Random Access Memory (RAM) 14. These programming applications include all of the Web Services programs discussed above for the practice of the present invention that will also be described hereinafter for operations wherein the system of FIG. 1 functions as the server support for the user application terminal in the accessing of Web Services.

A Read Only Memory (ROM) 16 is connected to CPU 10 via bus 12 and includes the Basic Input/Output System (BIOS) that controls the basic computer functions. RAM 14, I/O adapter 18 and communications adapter 34 are also interconnected to system bus 12. I/O adapter 18 may be a Small Computer System Interface (SCSI) adapter that communicates with the disk storage device 20. Communications adapter 34 interconnects bus 12 with an outside Web or like network as appropriate. I/O devices are also connected to system bus 12 via user interface adapter 22 and display adapter 36. Keyboard 24 and mouse 26 are all interconnected to bus 12 through user interface adapter 22. It is through such input devices that the user may interactively relate to the programs of this invention. Display adapter 36 includes a frame buffer 39 that is a storage device that holds a representation of each pixel on the display screen 38. Images may be stored in frame buffer 39 for display on monitor 38 through various components, such as a digital to analog converter (not shown) and the like. By using the aforementioned I/O devices, a user is capable of inputting information to the system through keyboard 24 or mouse 26 and receiving output information from the system via display 38.

Figure 2:
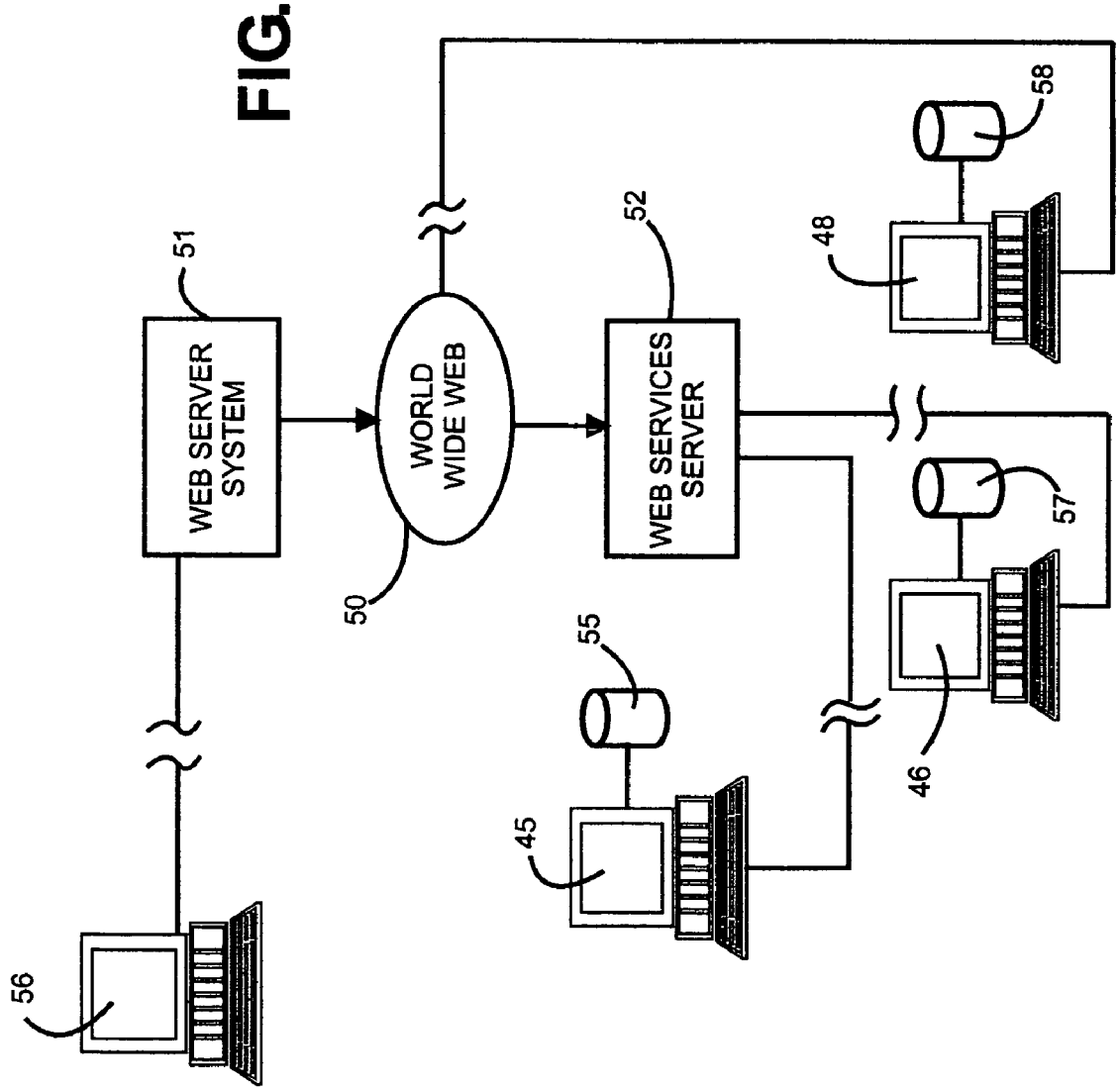
FIG. 2 is a generalized diagrammatic view of a Web portion upon which the present invention may be implemented.

A generalized example of the practice of the present invention involving SOAP message processing of WSDL documents with both SOAP and WSDL fault conditions delivered in WSDL fault message formats will be considered with respect to FIG. 2 that shows a generalized portion of the Web. First, it should be helpful to understand from a more general perspective the various elements and methods that may be related to the present invention. Since the present invention involves Web hypertext documents, such as Web documents and media and application program content therein, transmitted over networks, an understanding of the Internet or Web and its operating principles would be helpful. Reference has also been made to the applicability of the present invention to a global network, such as the Internet or Web. For details on Internet nodes, objects and links, reference is made to the above-mentioned text, *Mastering the Internet*. (World Wide Web and Internet are used interchangeably in this description.)

The Internet or Web is a global network of a heterogeneous mix of computer technologies and operating systems. Higher level objects are linked to lower level objects in the hierarchy through a variety of network server computers. These network servers are the key to network distribution, such as the distribution of Web pages and related documentation. In this connection, the term "documents" is used to describe data packets or data entities transmitted over the Web or other networks and is intended to include Web pages with displayable text, graphics and other images, as well as computer programs.

Web documents are conventionally implemented in HTML language, which is described in detail in the above-referenced text, *Just Java*, particularly at Chapter 7, pp. 249-268, dealing with the handling of Web pages; and also in the text, *Mastering the Internet*, particularly at pp. 637-642, on HTML in the formation of Web pages. In addition, aspects of this description will refer to Web browsers. A general and comprehensive description of browsers may be found in the above-mentioned *Mastering the Internet* text at pp. 291-313. More detailed browser descriptions may be found in the text, *Internet: The Complete Reference, Millennium Edition*, M. L. Young et al., Osborne/McGraw-Hill, Berkeley Calif., 1999, Chapter 19, pp. 419-454, on the Netscape Navigator; Chapter 20, pp. 455-494, on the Microsoft Internet Explorer; and Chapter 21, pp. 495-512, covering Lynx, Opera and other browsers.

Within this environment, Web Services distribution has evolved in recent years. Web Services are based on both suppliers of the data in the form of XML based messages and documents and applications consuming such data conforming to several industry standards developed by the W3C. The primary standard is XML for defining data and creating markup languages in the form of XML tags. The resulting XML documents are text based and, thus, may be processed on any platform in the distribution of the Web Services. Accordingly, suppliers who wish to offer their Web Services must qualify the proposed services according to the following standards:

XML: a hypertext markup language extensively used in the distribution of Web Services and other electronic business components over the Web. (For a basic description of Web Services, reference is made to the text: *Web Services, A Technical Introduction*, H. M. Deitel et al., published 2003, Prentice Hall, Upper Saddle River, for general information and particularly to Appendix A, pp. 319-334.)

(SOAP) Simple Object Access Protocol: a protocol established to enable the programming objects that form part of the XML items being distributed to communicate with each other via messages (Chapter 6 of the above text).

(UDDI) Universal Description, Discovery, and Integration Registry: where suppliers or developers may list their Web Services offered for distribution, i.e. advertise their Web Services.

(WSDL) Web Services Description Language: an XML language used by suppliers and developers for describing the offered Web Services on the UDDI Registry. This may be published on UDDI.

Java Web Services: an object oriented platform for Web Services distribution of modular object oriented items (described in Appendix C of the above-mentioned text).

To users and suppliers of Web Services who are qualified in all of the above required standards, the system has been efficient in the distribution of services over the Web. Web services may be discovered for use by applications from the UDDI, accessed over the Web from the suppliers to such requesting user applications and subsequently billed to and tracked if necessary by the requester.

In light of this background, reference is made to FIG. 2 showing a portion of the Web or Internet set up for the distribution of Web Services in accordance with the present invention. For purposes of the present embodiment, let computer station 56 serve as a typical receiving Web display station through which a user's application may access Web services. As will be described hereinafter with respect to the programs of FIGS. 3 and 4, the Web server system 51 processes the WSDL inquiries for applications related to station 56 that is transmitted over the Web 50 through appropriate servers 52 to Web Services suppliers as represented by supplier servers 45, 46 and 48 respectively supporting illustrative Web Services supplier databases 55, 57 and 58.

Figure 3:
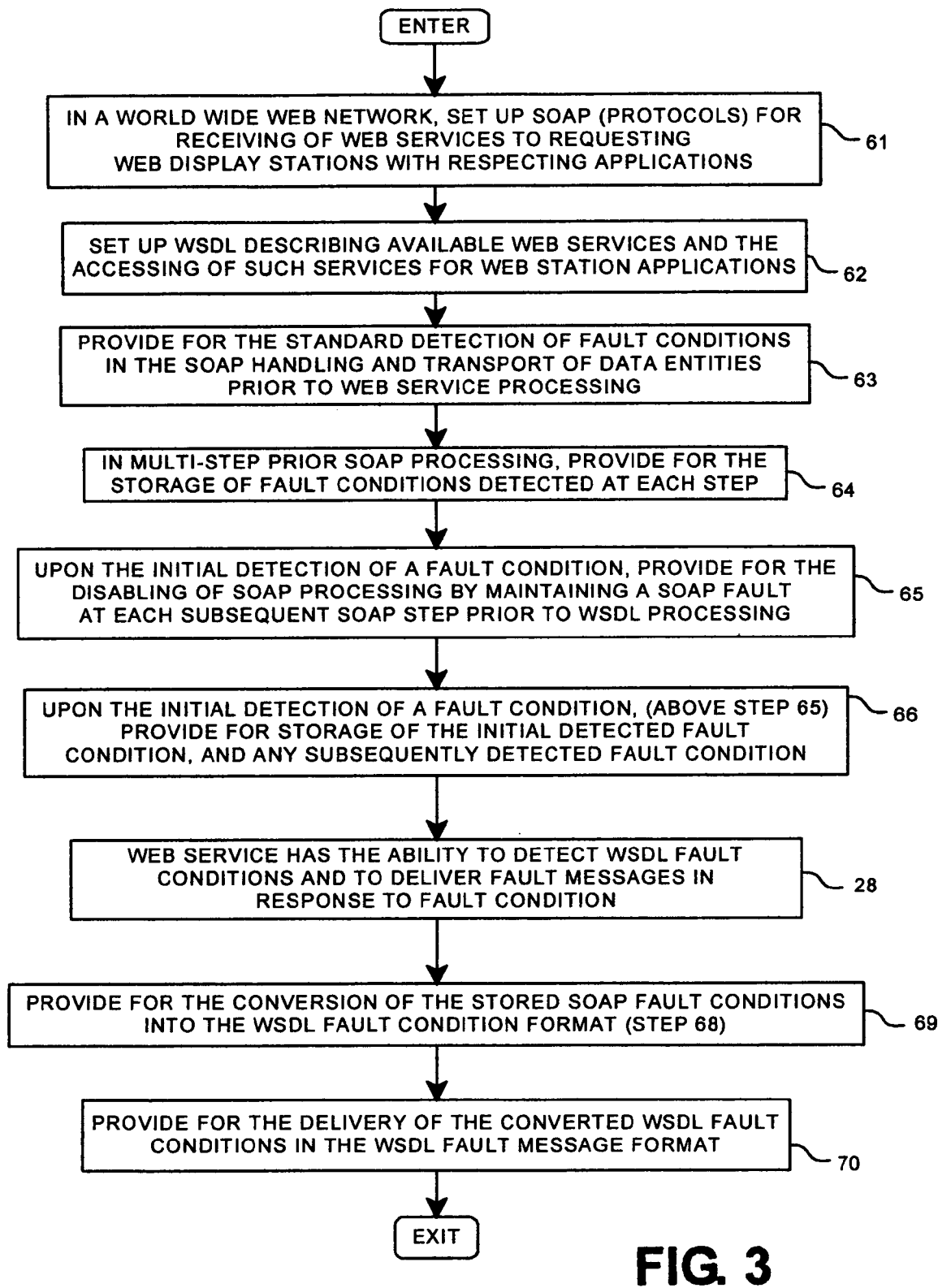
FIG. 3 is a general flowchart of a program set up to implement the present invention for the delivery of both SOAP and WSDL fault messages in only the WSDL fault message format.

FIG. 3 is a flowchart showing the development of a process according to the present invention for accessing Web Services in a Web environment. Many of the programming functions in the process of FIG. 3 have already been described in general with respect to FIGS. 1 and 2. In a Web environment, the conventional protocols described above are set up: SOAP for the handling and transport of Web Service messages and documents, requested from Web station applications, step 61, and WSDL for describing how to access Web Services and a description of such services, step 62. The SOAP protocols that are used for message processing have their standard fault detection and delivery implementations, step 63. In the multistage SOAP processing, provision is made for storing the faults detected at each stage, step 64. Upon the initial detection of a SOAP fault, provision is made for the disabling of SOAP fault message processing at each subsequent SOAP step prior to Web Services that involves WSDL processing, step 65. After this initial detection of a SOAP fault condition in step 65, provision is made for the storage of this fault and any subsequently detected fault, step 66. If this SOAP process provides for the processing of faults, provision is made for prohibiting such fault message processing with SOAP protocols, step 67.

Web Services with WSDL protocols that will now process the data, have a standard provision for the detection and sending of WSDL fault messages in response to fault detection, step 68. Provision is, thus, made for the conversion of the stored fault conditions from SOAP message processing into the WSDL fault message format, step 69, and provision is made for the delivery of the converted WSDL fault conditions in the converted WSDL fault message format, step 70.

Figure 4:
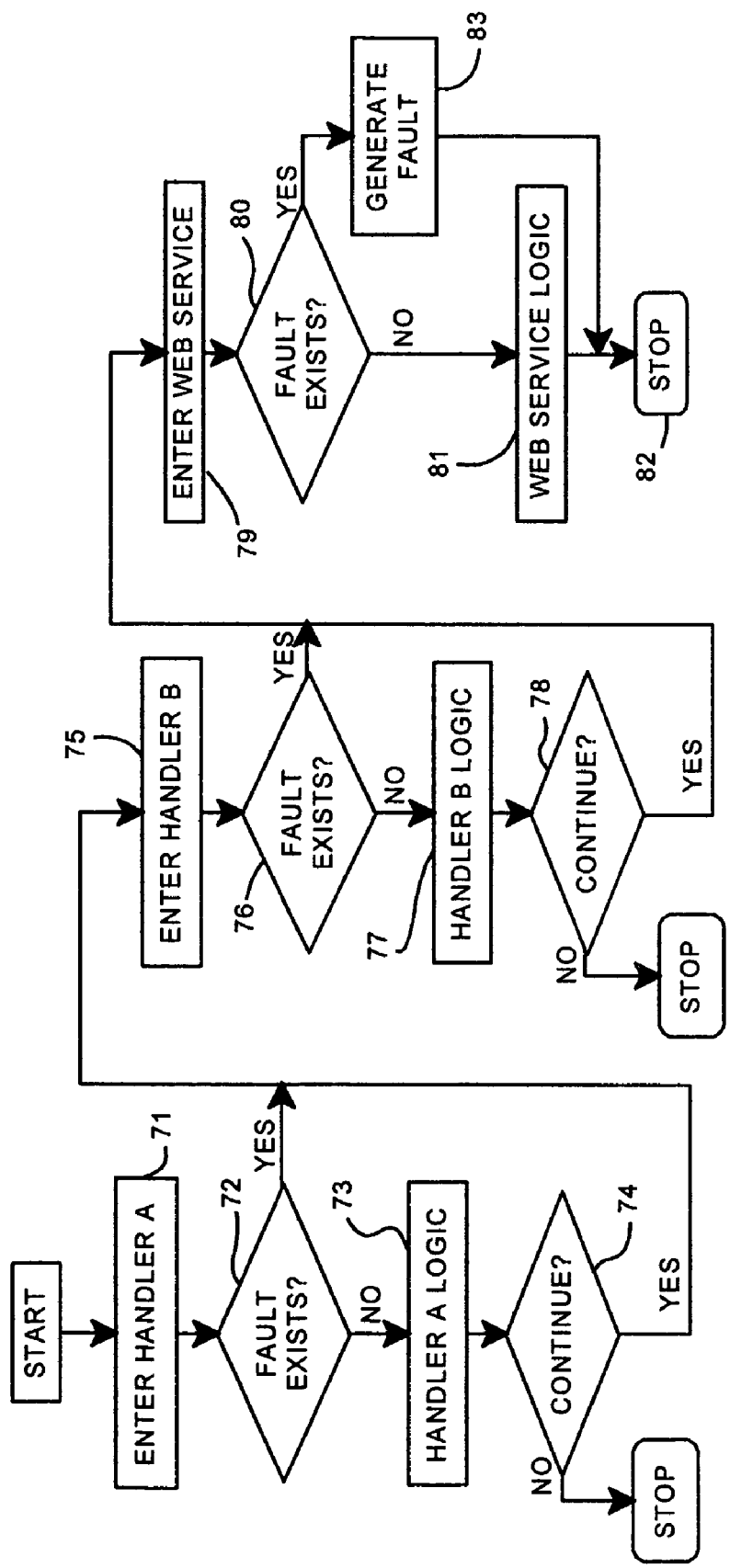
FIG. 4 is a flowchart of an illustrative run of the program set up in FIG. 3.

The running of the process set up in FIG. 3 will now be described with respect to the flowchart of FIG. 4. First, when the Web Service is deployed, there is set up a set of handlers: illustrated by HandlerA and HandlerB for preprocessing of the WSDL request. Where no faults exist, the normal SOAP processing proceeds unimpeded: enter HandlerA, step 71, a determination of No fault, step 72, normal HandlerA logic processing, step 73, Continue, step 74: Yes; then to enter HandlerB, step 75, a determination of No fault, step 76, normal HandlerB logic processing, step 77, Continue, step 78: Yes; then to enter Web Service, step 79, a determination of fault, step 80; if No, then normal Web Service logic processing, step 81, and then to completion, step 82. Alternatively, if there was a WSDL fault, Yes, step 80, then the generation of a WSDL fault message, step 83 and end, step 82.

Now according to the present invention, assume a SOAP error or fault in the HandlerA processing. Then, this fault will be detected by HandlerA logic, step 73, but instead of generating a SOAP fault message, the handler will create the fault data in a well known set of properties carried in the SOAP-MessageContext (prefixed with fault and then defining the fault data). The Handler logic 73 does not do its processing of data but completes whatever processing is needed to continue (Yes, step 74). Enter HandlerB 75 wherein a fault checking code is set up at the beginning of the handleRequest method to determine if a prior Handler has generated a fault condition. Since the HandlerB process 75 will determine that Yes, step 76, a fault exists, then steps 77 and 78 will be by-passed, and HandlerB 75 will complete the processing to branch to Enter Web Service 79. In Web Service 79, there is an initial code check to determine if a fault has been generated by any of the prior SOAP handlers, step 80. If Yes, the Web Service extracts the fault data from the above-mentioned SOAPMessageContext, and, in effect, converts, step 83 to a WSDL defined fault by populating a WSDL defined fault object, not proceeding with the Web Service Logic, step 81, and stopping the WSDL function, step 82. The WSDL fault message is then returned to the requesting user application as an operable WSDL fault in the WSDL fault message format. It will be understood that the processing would be essentially the same if the fault came up in the HandlerB processing or if additional Handlers existed in the chain.

Although certain preferred embodiments have been shown and described, it will be understood that many changes and modifications may be made therein without departing from the scope and intent of the appended claims.

What is claimed is:

1. In a World Wide Web (Web) communication network with access via a plurality of data processor controlled Web stations, a Web Service distribution system comprising:
   Simple Object Access Protocol (SOAP) means for the transporting and handling of data entities to and from said Web stations including:
      a sequence of data entity handlers, each handler including SOAP fault detecting means, wherein each handler includes means responsive to a SOAP fault detection for disabling said fault detection means of the handler and of each subsequent handler in said sequence of handlers;
   means for detecting fault conditions in said SOAP means for the transport and handling of said data entities;
   Web Services Description Language (WSDL) means for accessing specific Web services for said data entities;
   means for detecting fault conditions in said WSDL means;
   means responsive to the detection of WSDL fault conditions for sending fault WSDL message data to selected Web stations;
   means for prohibiting the sending of SOAP fault message data detected in the transport and handling of data entities for which entities Web services are to be accessed, and
   means for converting said prohibited SOAP fault data into WSDL message data during the access of such Web Services, wherein said converted data is sent as a WSDL fault message.

2. The Web Services distribution system of claim 1 wherein each handler includes means for storing said detected SOAP fault.

3. The Web Services distribution system of claim 2 wherein said means for converting converts said stored SOAP faults into said WSDL fault message.

4. In a Web communication network with access via a plurality of data processor controlled Web stations, a method of Web Service distribution comprising:
   transporting and handling data entities at and between said Web stations by a method implementing the Simple Object Access Protocol (SOAP), said method including:
      a plurality of data entity handling steps carried out in sequence, each handling step including a SOAP fault detecting step wherein each of said data entity handling steps, responsive to a SOAP fault detection, disables the fault detection step in said handling step and in each subsequent handling step in said sequence of handling steps;
   detecting fault conditions in the data entities being transported and handled by said SOAP method;
   accessing specific Web services for said data entities through WSDL protocols;
   detecting fault conditions in the processing of said data entities through said WSDL protocols;
   sending WSDL fault message data to selected display stations responsive to the detection of fault conditions through said WSDL protocols;
   prohibiting the sending of fault message data detected in the transport and handling of data entities for which entities Web Services are to be accessed; and
   converting said prohibited SOAP fault message data into WSDL fault message data during the access of such Web Services, wherein said converted data is sent as a WSDL fault message.

5. The Web Services distribution method of claim 4 wherein each of said data handling steps further includes a step of storing said detected SOAP fault.

6. The Web Services distribution method of claim 5 wherein said converting step converts said stored SOAP fault into a WSDL fault message.

7. A computer usable medium having stored thereon, a computer program for Web Service distribution in a Web communication network with access via a plurality of data processor controlled Web stations, wherein the computer program when executed on a computer causes the computer to:
   transport and handle data entities at and between said Web stations by implementing the Simple Object Access Protocol (SOAP), including:
      a plurality of data entity handling steps carried out in sequence, each handling step including SOAP fault detection wherein each of said data entity handling steps, responsive to a SOAP fault detection, disables the fault detection in said handling step and in each subsequent handling step in said sequence of handling steps;

detect fault conditions in the data entities being transported and handled by said SOAP;

access specific Web services for said data entities through WSDL protocols;

detect fault conditions in the processing of said data entities through said WSDL protocols;

send WSDL fault message data to selected display stations responsive to the detection of fault conditions through said WSDL protocols;

prohibit the sending of fault message data detected in the transport and handling of data entities for which entities Web Services are to be accessed; and convert said prohibited SOAP fault message data into WSDL fault message data during the access of such Web Services, wherein said converted data is sent as a WSDL fault message.

8. The computer usable medium of claim 7 wherein said computer program when executed causes the computer to store each of the SOAP faults detected during said data handling.

9. The computer usable medium of claim 7 wherein said computer program when executed causes the computer to convert said stored SOAP faults into WSDL fault messages.

* * * * *